United States Patent
Bank et al.

(10) Patent No.: US 9,535,819 B2
(45) Date of Patent: Jan. 3, 2017

(54) IDENTIFYING THE LINES OF CODE THAT CAUSED THE ERROR AS IDENTIFIED IN THE STACK TRACE IN A SOURCE CODE VERSION THAT GENERATED THE STACK TRACE THAT DOES NOT RESIDE ON THE USER'S COMPUTING DEVICE

(71) Applicant: International Business Machines Corporation, Armonk, NY (US)

(72) Inventors: Judith H. Bank, Cary, NC (US); Lisa M. Bradley, Cary, NC (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/627,987

(22) Filed: Feb. 20, 2015

(65) Prior Publication Data

US 2016/0246703 A1    Aug. 25, 2016

(51) Int. Cl.
    *G06F 9/45*      (2006.01)
    *G06F 11/36*     (2006.01)
    *G06F 9/44*      (2006.01)
    *G06F 11/34*     (2006.01)

(52) U.S. Cl.
    CPC ............. *G06F 11/3664* (2013.01); *G06F 8/71* (2013.01); *G06F 11/34* (2013.01)

(58) Field of Classification Search
    None
    See application file for complete search history.

(56) References Cited

U.S. PATENT DOCUMENTS

| | | | | |
|---|---|---|---|---|
| 6,738,928 B1* | 5/2004 | Brown | ................. | G06F 11/2268 714/26 |
| 8,473,251 B1* | 6/2013 | Noth | ................... | G06F 11/0742 702/183 |
| 8,719,791 B1* | 5/2014 | MacPherson | ......... | G06F 9/4426 717/104 |
| 8,924,790 B2* | 12/2014 | Huang | ........................ | 714/38.1 |
| 9,104,797 B1* | 8/2015 | Sekhar | .................. | G06F 11/362 |
| 9,135,146 B1* | 9/2015 | Allen | ..................... | G06F 11/366 |
| 9,223,679 B1* | 12/2015 | Ho | ......................... | G06F 11/362 |
| 2004/0078689 A1* | 4/2004 | Knuutila | ............... | G06F 11/0709 714/38.1 |
| 2008/0244531 A1* | 10/2008 | Schmelter | ........... | G06F 11/3636 717/128 |

(Continued)

*Primary Examiner* — Isaac T Tecklu
(74) *Attorney, Agent, or Firm* — Robert A. Voigt, Jr.; Winstead, P.C.

(57) ABSTRACT

A method, system and computer program product for identifying lines of code that caused an error as identified in a stack trace in a source code version that generated the stack trace. The line(s) of code in the source code version that generated the stack trace that are identified in the stack trace as causing the error are identified. If there are differences in the line(s) of code that are associated with the cause of the error between the source code version that generated the stack trace and the source code version being utilized by the user, such as a developer, then an annotated version of the source code version that generated the stack trace of the line(s) of code that caused the error is displayed to the user with highlighted differences with respect to the source code version being utilized by the user.

14 Claims, 4 Drawing Sheets

(56) References Cited

U.S. PATENT DOCUMENTS

| | | | |
|---|---|---|---|
| 2009/0070733 A1* | 3/2009 | Huang | G06F 11/366 717/101 |
| 2009/0158099 A1* | 6/2009 | Cui | G06F 11/0748 714/57 |
| 2009/0327809 A1* | 12/2009 | Joy | G06F 11/366 714/26 |
| 2010/0211932 A1* | 8/2010 | Jones | G06F 11/3624 717/124 |
| 2011/0219360 A1* | 9/2011 | Srinivasa | G06F 17/30 717/124 |
| 2012/0005667 A1* | 1/2012 | DeLuca | G06F 8/30 717/170 |
| 2012/0144374 A1* | 6/2012 | Gallagher | G06F 11/362 717/128 |
| 2012/0180024 A1* | 7/2012 | Gonzalez | G06F 8/71 717/109 |
| 2013/0047140 A1* | 2/2013 | Shann | G06F 11/3664 717/128 |
| 2013/0055221 A1* | 2/2013 | Murthy | G06F 11/3608 717/132 |
| 2013/0198572 A1* | 8/2013 | Han | G06F 11/3636 714/38.1 |

* cited by examiner

402 — View of Source Code on User's Computing Device

401:
```
Line 602:
Line 603: if (x>y) {
Line 604:     System.out.println("allow the installation");
Line 605: }
. . .
Line 613: JSONObject status = (JSONObject)get Status(pty, user);
Line 614: String value = (String)status.get ("value");
```

404 — Annotated View of Source Code That Generated Stack Trace

403:
```
Line 598: # script of printing out the phrase "allow the installation"
Line 599: if (x>y) {
Line 600:     System.out.println("allow the installation");
Line 601: }
Line 602: JSONObject status = (JSONObject)get Status(pty, user);
Line 603: String value = (String)status.get("value");
```

FIG. 4

IDENTIFYING THE LINES OF CODE THAT CAUSED THE ERROR AS IDENTIFIED IN THE STACK TRACE IN A SOURCE CODE VERSION THAT GENERATED THE STACK TRACE THAT DOES NOT RESIDE ON THE USER'S COMPUTING DEVICE

TECHNICAL FIELD

The present invention relates generally to troubleshooting stack traces, and more particularly to assisting the user with identifying lines of code that caused the error (e.g., exception in the code) as identified in the stack in a source code version that generated the stack trace that does not reside on the user's computing device.

BACKGROUND

In lower-level programming languages there is a functionality known as a "stack trace," which is a debugging functionality that is used by programmers to track down bugs that appear in the code. The stack trace allows a programmer to pull up the list of functions that were called which lead to some crash or exception in the code. Typically, the user may see the stack trace displayed as part of an error message. Furthermore, the stack trace shows where the error occurs, such as a particular line number (s) of the source code.

In the scenario where a developer receives a stack trace displayed as part of an error message which was forwarded to the developer from the client, the developer attempts to identify the source of the error in the source code as identified in the stack trace. However, the stack trace may be associated with a difference version of the code (the version of the source code utilized by the client), including a different software build, than the version of the code on the developer's computing system. Hence, the developer would have to identify the compiled version of the code that generated the stack trace, obtain that source code version from a repository and then load that source code version in the developer's local environment to locate the line(s) of code that caused the error. Such a process is laborsome and inefficient.

BRIEF SUMMARY

In one embodiment of the present invention, a method for identifying lines of code that caused an error as identified in a stack trace in a source code version that generated the stack trace, the method comprises receiving a stack trace performed to detect a cause of an error. The method further comprises identifying a version of a source code that generated the stack trace. The method additionally comprises identifying one or more lines of code in the source code version that generated the stack trace that are identified in the stack trace as being associated with the cause of the error. Furthermore, the method comprises comparing, by a processor, the source code version that generated the stack trace with a version of the source code currently being utilized in a user's computing system. Additionally, the method comprises displaying one or more lines of code in the source code version being utilized in the user's computing system that correspond to the one or more lines of code of the source code version that generated the stack trace that caused the error as well as displaying an annotated version of the source code version that generated the stack trace of the one or more lines of code that caused the error with highlighted differences with respect to the source code version being utilized in the user's computing system in response to differences in the one or more lines of code that are associated with the cause of the error between the source code version that generated the stack trace and the source code version being utilized in the user's computing system.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 4 illustrates a display of the lines of code in the source code version being utilized by a user of the computing system that are associated with the lines of code identified in the stack trace as causing the error as well as a display of the lines of code in an annotated version of the source code version that generated the stack trace that are associated with the lines of code identified in the stack trace as causing the error with highlighted differences with respect to the corresponding lines of code in the source code version being utilized by the user of the computing system in accordance with an embodiment of the present invention.

DETAILED DESCRIPTION

Figure 1:
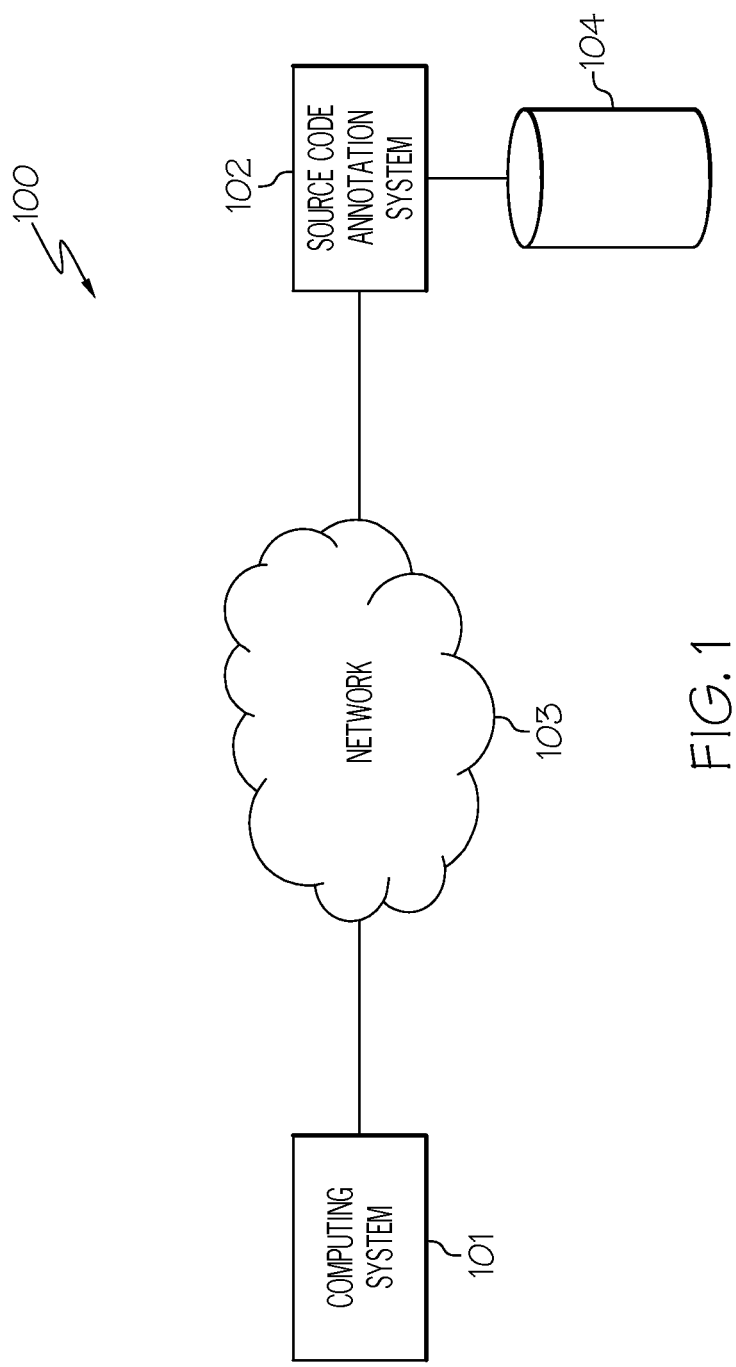
FIG. 1 illustrates a network system configured in accordance with an embodiment of the present invention.

The present invention comprises a method, system and computer program product for identifying lines of code that caused an error as identified in a stack trace in a source code version that generated the stack trace. In one embodiment of the present invention, a stack trace that was performed to detect the cause of an error during the execution of a program is received. The version of the source code that generated the stack trace is identified. Furthermore, the line(s) of code in the source code version that generated the stack trace as being associated with the cause of the error is identified, such as via the stack trace. The source code version that generated the stack trace is then compared with the version of the source code being utilized by the user of a computing system, such as a developer. For example, the source code version that generated the stack trace may reside in a repository and may be a prior version than the version being utilized by the developer. Such a comparison may involve finding and matching the lines of code between the source code version being utilized by the developer and the source code version that generated the stack trace as well as also identifying those lines of code that do not match. If there are differences in the line(s) of code that are associated with the cause of the error between the source code version that generated the stack trace and the source code version being utilized by the user of the computing system, then the line(s) of code in the source code version being utilized by the user of computing system that correspond to the line(s) of code of the source code version that generated the stack trace that caused the error are displayed to the user. Furthermore, an annotated version of the source code version that generated the stack trace of the line(s) of code that caused the error is displayed to the user with highlighted differences with respect to the source code version being utilized by the user. In this manner, the user can quickly identify the line(s) of code in the source code version being utilized by the user that caused the error as identified in the stack trace without having to identify the compiled version of the code that generated the stack trace, obtain that source code version from a repository and then load that source code version in the developer's local environment to locate the line(s) of code that caused the error.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a network system 100 configured in accordance with an embodiment of the present invention. Network system 100 includes a computing system 101 connected to a unit referred to herein as the "source code annotation system" 102 via a network 103. Computing system 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to source code annotation system 102 via network 103.

Source code annotation system 102 is configured to identify the lines of code that caused an error as identified in a stack trace in a source code version that generated the stack trace and map those lines of code to the lines of code in the source code version that the user (e.g., developer) of computing system 101 is currently utilizing in the case where the source code version that is being utilized by the user of computing system 101 is different than the source code version that generated the stack trace. A further description of the functionality of source code annotation system 102 is provided further below in connection with FIGS. 3-4. A hardware configuration of source code annotation system 102 is discussed below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Furthermore, as illustrated in FIG. 1, system 100 includes a repository 104 that stores the source code (e.g., compiled source code versions). Such source code versions may be compared with a source code version utilized by a user (e.g., developer) of computing system 101 which may differ by source code annotation system 102 as discussed further below in connection with FIGS. 3-4.

Figure 2:
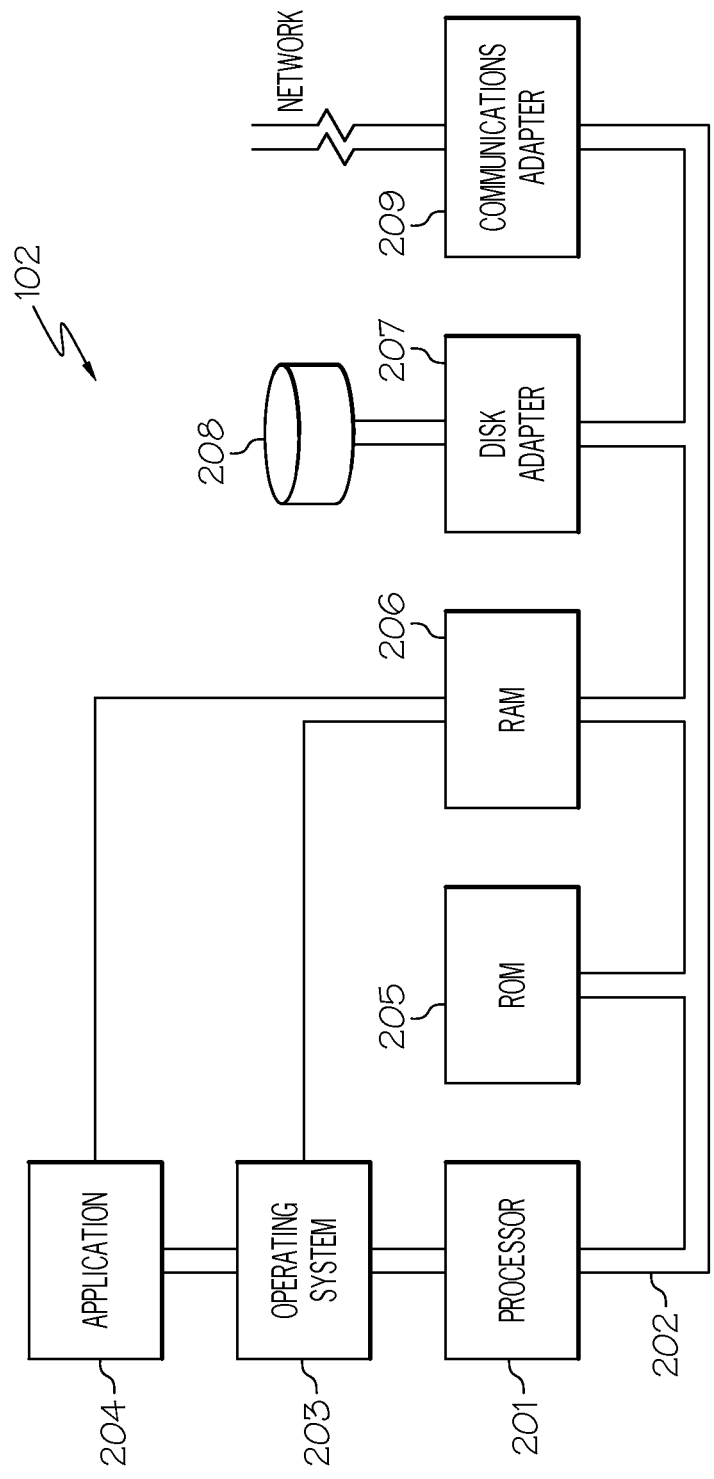
FIG. 2 illustrates a hardware configuration of a source code annotation system for practicing the principles of the present invention in accordance with an embodiment of the present invention.

Referring now to FIG. 2, FIG. 2 illustrates a hardware configuration of source code annotation system 102 (FIG. 1) for practicing the principles of the present invention in accordance with an embodiment of the present invention.

As illustrated in FIG. 2, source code annotation system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for identifying lines of code that caused an error as identified in a stack trace in a source code version that generated the stack trace in comparison with a source code version being utilized by a user of computing system 101 (FIG. 1) as discussed below in association with FIGS. 3-4.

Referring again to FIG. 2, read-only memory ("ROM") 205 is coupled to system bus 202 and includes a basic input/output system ("BIOS") that controls certain basic functions of source code annotation system 102. Random access memory ("RAM") 206 and disk adapter 207 are also coupled to system bus 202. It should be noted that software components including operating system 203 and application 204 may be loaded into RAM 206, which may be source code annotation system's 102 main memory for execution. Disk adapter 207 may be an integrated drive electronics ("IDE") adapter that communicates with a disk unit 208, e.g., disk drive. It is noted that the program for identifying lines of code that caused an error as identified in a stack trace in a source code version that generated the stack trace in comparison with a source code version being utilized by a user of computing system 101, as discussed below in association with FIGS. 3-4, may reside in disk unit 208 or in application 204.

Source code annotation system 102 may further include a communications adapter 209 coupled to bus 202. Communications adapter 209 interconnects bus 202 with an outside network (e.g., network 103 of FIG. 1) thereby enabling source code annotation system 102 to communicate with other devices, such as computing system 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in lower-level programming languages there is a functionality known as a "stack trace," which is a debugging functionality that is used by programmers to track down bugs that appear in the code. The stack trace allows a programmer to pull up the list of functions that were called which lead to some crash or exception in the code. Typically, the user may see the stack trace displayed as part of an error message. Furthermore, the stack trace shows where the error occurs, such as a particular line number (s) of the source code. In the scenario where a developer receives a stack trace displayed as part of an error message which was forwarded to the developer from the client, the developer attempts to identify the source of the error in the source code as identified in the stack trace. However, the stack trace may be associated with a different version of the code (the version of the source code utilized by the client), including a different software build, than the version of the code on the developer's computing system. Hence, the developer would have to identify the compiled version of the code that generated the stack trace, obtain that source code version from a repository and then load that source code version in the developer's local environment to locate the line(s) of code that caused the error. Such a process is laborsome and inefficient.

Figure 3:
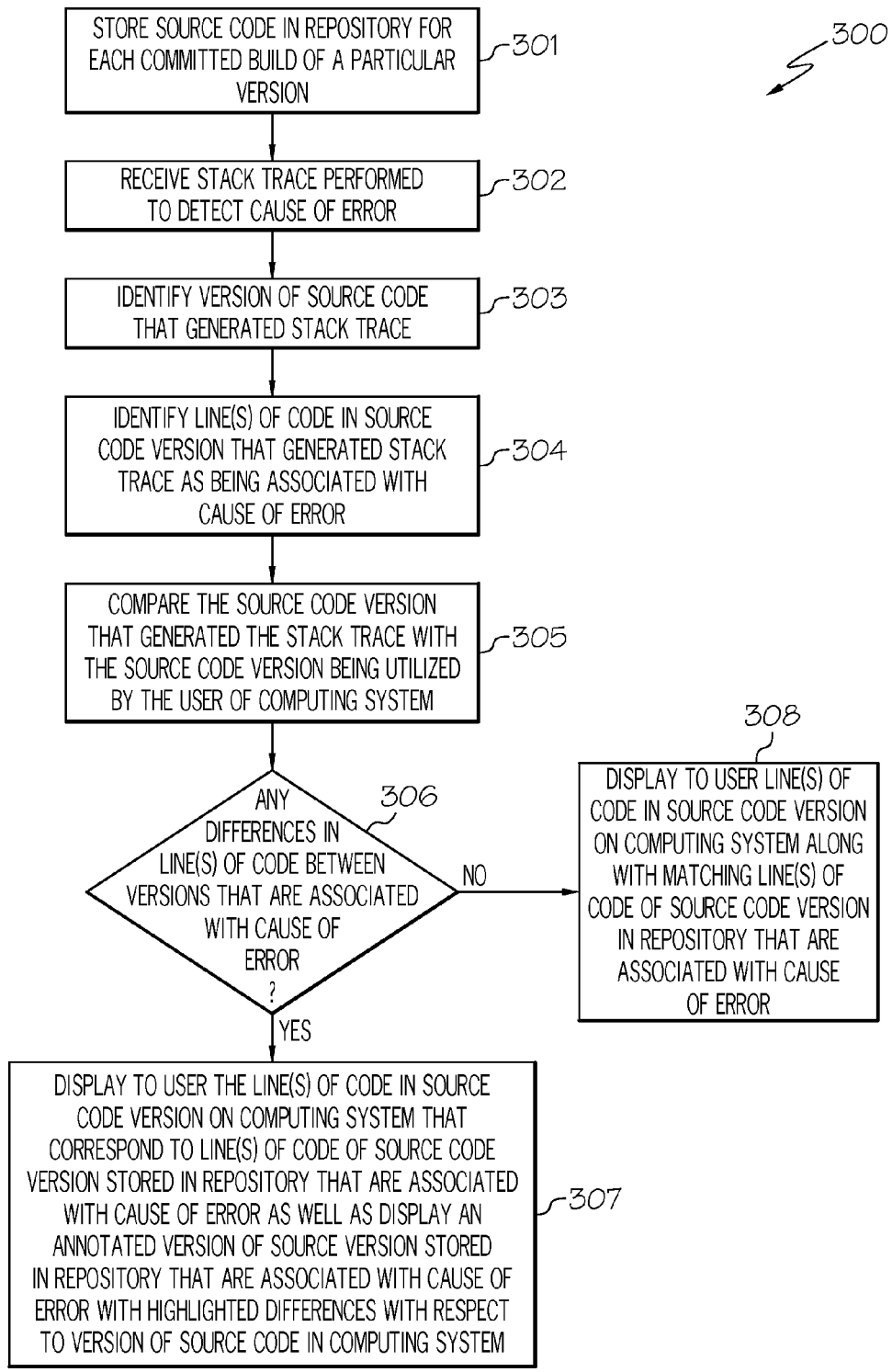
FIG. 3 is a flowchart of a method for identifying the lines of code that caused an error as identified in a stack trace in a source code version that generated the stack trace in comparison with a source code version being utilized by a user of a computing system, such as a developer, in accordance with an embodiment of the present invention.

The principles of the present invention provide a means for identifying lines of code that caused an error as identified in a stack trace in a source code version that generated the stack trace in comparison with a source code version being utilized by the developer as discussed below in connection with FIGS. 3-4. FIG. 3 is a flowchart of a method for identifying lines of code that caused an error as identified in a stack trace in a source code version that generated the stack trace in comparison with a source code version being utilized by a user (e.g., developer) of computing system 101. FIG. 4 illustrates a display of the lines of code in the source code version being utilized by a user of computing system 101 (FIG. 1) that are associated with the lines of code identified in the stack trace as causing the error as well as a display of the lines of code in an annotated version of the source code version that generated the stack trace that are associated with the lines of code identified in the stack trace as causing the error with highlighted differences with respect to the corresponding lines of code in the source code version being utilized by the user of computing system 101.

As stated above, FIG. 3 is a flowchart of a method 300 for identifying lines of code that caused an error as identified in a stack trace in a source code version that generated the stack trace in comparison with a source code version being utilized by a user (e.g., developer) of computing system 101 in accordance with an embodiment of the present invention.

Referring to FIG. 3, in conjunction with FIGS. 1-2, in step 301, source code annotation system 102 stores the source code in repository 104 for each committed build of a particular version.

In step 302, source code annotation system 102 receives the stack trace that was performed to detect the cause of an error during the execution of a program. A stack trace may be provided in connection with an error message. An exemplary stack trace is provided below:

statusCode: 500: CWZPL0027X: Failed to delete plug-ins <2.1.1>
at com.ibm.maestro.plugin.services.PluginService.delete (PluginService.java:941)
at com.ibm.maestro.plugin.services.PluginService.delete (PluginService.java:839)).
------Start of DE processing------=[9/19/13 0:35:36: 594 UTC], key=
com.ibm.maestro.common.http.HttpException: statusCode: 500: CWZPL0027X: Failed to delete plug-ins com.ibm. maes
tro.plugin.services.PatternTypeService 2918
Exception=com.ibm.maestro.common.http.HttpException
Source=com.ibm.maestro.plugin.services.PatternTypeService
probeid=2918
Stack
Dump=com.ibm.maestro.common.http.HttpException:
statusCode: 500: CWZPL0027X: Failed to delete plug-ins
at com.ibm.maestro.plugin.services.PluginService.delete (PluginService.java:941)
at com.ibm.maestro.plugin.services.PluginService.delete (PluginService.java:839)
at com.ibm.maestro.plugin.services.PatternTypeService. delete
PatternTypeArtifacts(PatternTypeService.java:2917)
at com.ibm.maestro.plugin.services.PatternTypeService. delete(PatternTypeService.java:2856)
at com.ibm.maestro.plugin.services.PatternTypeService. delete(PatternTypeService.java:2720)
at com.ibm.maestro.pluginsesources.PatternTypeResource.delete(PatternTypeResource.java:418)
at sunseflect.NativeMethodAccessorImpl.invoke0(Native Method)
Caused by: java.lang.NullPointerException
at com.ibm.maestro.plugin.services.PatternTypeService. listAll
PatternTypes(PatternTypeService.java:602)
at com.ibm.maestro.plugin.services.PatternTypeService. update
PluginsAllPtypeVRs(PatternTypeService.java:1728)
at com.ibm.maestro.plugin.services.PluginService.delete (PluginService.java:909)

In step 303, source code annotation system 102 identifies the version of the source code that generated the stack trace. In one embodiment, the source file names, such as the version of the source code that generated the stack trace, is available in the stack trace. In such an embodiment, such information may be provided in the stack trace by having a pluggable script in the development environment collect the version of the source code during the build configuration. In another embodiment, the version of the source code that generated the stack trace is provided by the user of computing system 101. In one embodiment, the identified version of the source code that generated the stack trace is stored in repository 104.

In step 304, source code annotation system 102 identifies the line(s) of code in the source code version that generated the stack trace as being associated with the cause of the error. For example, referring to the exemplary stack trace shown above, the line of code in the source code version that generated the stack trace that is associated with the cause of error corresponds to line number 602 as illustrated in the following lines of the stack trace:
Caused by: java.lang.NullPointerException
at com.ibm.maestro.plugin.services.PatternTypeService. listAll
PatternTypes(PatternTypeService.java:602)

In step 305, source code annotation system 102 compares the source code version that generated the stack trace with the version of the source code being utilized by the user of computing system 101 (e.g., developer). For example, the source code version that generated the stack trace may reside in repository 104 and may be a prior version than the version being utilized by the user of computing system 101. It is noted that while the example illustrates the version of the source code on the user's computing system 101 being a more current version than the version of the source code that generated the stack trace, the principles of the present invention are not to be limited as such. The version of the source code on the user's computing system 101 may be a prior version than the version of the source code that generated the stack trace. Furthermore, the use of the term "source code version" herein includes software builds.

In one embodiment, the comparison of step 305 may involve finding and matching lines of code between the source code version being utilized by the user of computing system 101 and the source code version that generated the stack trace. For instance, referring to the above example of the stack trace, the function PatternTypeService.java may contain 1,000 lines of code in the developer's computing system 101; whereas, in the source code version that generated the stack trace, the function PatternTypeService.java contains 970 lines of code. In one embodiment, source code annotation system 102 identifies the lines of code that match and do not match between the source code versions. Furthermore, as will be discussed in further detail below, source code annotation system 102 identifies those lines of code in the source code version that generated the stack trace that is stored in repository 104 that differ from the corresponding lines of code in the source code version being utilized by the user of computing system 101.

Additionally, as will be discussed in further detail below, source code annotation system 102 identifies the changes in the lines of code for the same code between the versions. For example, suppose line 101 of the source code that generated the stack that is stored in repository 104 corresponds to the following:
Line 101 {"firstName": "John", "lastName": "Doe"}
If such code corresponds to line 102 in the source code version being utilized by the user of computing system 101, then source code annotation system 102 notes such a change and may indicate such a change in an annotated version of the source code version that generated the stack trace as discussed below.

In one embodiment, source code annotation system 102 recalibrates the line numbers with respect to each version of the same source code stored in repository 104 to reflect any changes each time a version of the source code is updated in repository 104. That is, source code annotation system 102 keeps track of the changes in the lines of code for matching code among the various versions of the source code stored in repository 104.

In step 306, a determination is made by source code annotation system 102 as to whether there any differences in the line(s) of code that are associated with the cause of the error between the source code version that generated the stack trace and the source code version being utilized by the user (e.g., developer) of computing system 101.

If there are differences in the line(s) of code that are associated with the cause of the error between the source code version that generated the stack trace and the source code version being utilized by the user (e.g., developer) of computing system 101, then, in step 307, source code annotation system 102 displays to the user of computing system 101 the line(s) of code in the source code version being utilized by the user of computing system 101 that correspond to the line(s) of code of the source code version that generated the stack trace that caused the error. Furthermore, in step 307, source code annotation system 102 displays an annotated version of the source code version that generated the stack trace of the line(s) of code that caused the error with highlighted differences with respect to the source code version being utilized by the user of computing system 101 as illustrated in FIG. 4.

FIG. 4 illustrates a display of the lines of code in the source code version being utilized by a user of computing system 101 (FIG. 1) that are associated with the lines of code identified in the stack trace as causing the error as well as a display of the lines of code in an annotated version of the source code version that generated the stack trace that are associated with the lines of code identified in the stack trace as causing the error with highlighted differences with respect to the corresponding lines of code in the source code version being utilized by the user of computing system 101 in accordance with an embodiment of the present invention.

Referring to FIG. 4, in conjunction with FIGS. 1-3, the lines of code 401 in the source code version being utilized by a user of computing system 101 that are associated with the lines of code identified in the stack trace as causing the error are displayed to the user of computer system 101 in a "default view" 402. Furthermore, as illustrated in FIG. 4, the lines of code 403 in an annotated version of the source code version that generated the stack trace that are associated with the lines of code identified in the stack trace as causing the error with highlighted differences with respect to the corresponding lines of code in the source code version being utilized by the user of computing system 101 are displayed to the user of computer system 101 in an "annotated view" 404. In one embodiment, as illustrated in annotated view 404, any lines of code in the source code version that generated the stack trace that have been deleted with respect to the version being utilized by the user of computing system 101 are shown via strikethroughs as illustrated in the strikethrough of line 598 (comment line) of the annotated version of the source code version that generated the stack trace. Furthermore, as illustrated in annotated view 404, any lines of code in the source code version that generated the stack trace that have been added with respect to the version being utilized by the user of computing system 101 are shown via strikethroughs as illustrated in the strikethroughs of lines 599 and 601, where, as an example, the code "System.out.println("allow the installation");" is now within the routine of "if (x>y)" as illustrated in lines 603 and 605 in the source code version being utilized by a user of computing system 101 as shown in default view 402.

Furthermore, source code annotation system 102 may also show the line(s) of code in the source code version that generated the stack trace that are identified as causing the error with the same code as the code in the source code version that is being utilized by the user of computing system 101. Such lines of code (e.g., lines 600, 602 and 603) may be identified without any strikethroughs in the code in annotated view 404 of the source code that generated the stack trace along with the lines of code that highlight the differences between the source code versions.

In this manner, the user of computing system 101 can quickly identify the line(s) of code in the source code version being utilized by the user of computing system 101 that caused the error as identified in the stack trace without having to identify the compiled version of the code that generated the stack trace, obtain that source code version from repository 104 and then load that source code version in the developer's local environment to locate the line(s) of code that caused the error.

Furthermore, in one embodiment, annotated view 404 may indicate the matching code (code that matches with the source code version being utilized by the user of computing system 101) whose line number has changed with respect to the source code version being utilized by the user of computing system 101. For example, lines 600 and 602-603 of the source code version that generated the stack trace as shown in annotated view 404 now correspond to lines 604 and 613-614 of the source code version that is being utilized by the user of computing system 101 as shown in default view 402. In one embodiment, source code annotation system 102 may indicate such a change (not shown in FIG. 4) via strikethroughs of line numbers 600 and 602-603 of the source code version that generated the stack trace as well as include an indication (e.g., line number) of the corresponding line numbers (lines 604 and 613-614) of the source code version that is being utilized by the user of computing system 101.

The principles of the present invention are not to be limited in scope to any particular manner (e.g., strikethroughs) in showing the changes or differences with respect to the source code versions. The principles of the present invention are to include any means (e.g., color, underlining) which allow the user to quickly identify the lines of code in the version being utilized by the user of computing system 101 that correspond to the lines of code in the source code version that generated the stack trace that caused the error identified in the stack trace.

Returning to FIG. 3, in conjunction with FIGS. 1-2 and 4, if there are no differences in the line(s) of code that are associated with the cause of the error between the source code version that generated the stack trace and the source code version being utilized by the user (e.g., developer) of computing system 101, then, in step 308, source code annotation system 102 displays to the user of computing system 101 the line(s) of code in the source code version being utilized by the user of computing system 101 along with the matching line(s) of code of the source code version that generated the stack trace that are associated with the cause of the error. For instance, in one embodiment, source code annotation system 102 would display the lines of code that are associated with the cause of the error in both the source code version on the user's computing device (displayed in default view 402) and the source code version that generated the stack trace (displayed in annotated view 404), where both versions of code would match.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying lines of code that caused an error as identified in a stack trace in a source code version that generated the stack trace, the method comprising:
receiving a stack trace performed to detect a cause of an error;
identifying a version of a source code that generated said stack trace;
identifying one or more lines of code in said source code version that generated said stack trace that are identified in said stack trace as being associated with said cause of said error;
comparing, by a processor, said source code version that generated said stack trace with a version of said source code currently being utilized in a user's computing system; and
displaying one or more lines of code in said source code version being utilized in said user's computing system that correspond to said one or more lines of code of said source code version that generated said stack trace that caused said error as well as displaying an annotated version of said source code version that generated said stack trace of said one or more lines of code that caused said error with highlighted differences with respect to said source code version being utilized in said user's computing system in response to differences in said one or more lines of code that are associated with said cause of said error between said source code version that generated said stack trace and said source code version being utilized in said user's computing system;
wherein said comparison comprises finding and matching lines of code between said source code version being utilized in said user's computing system and said source code version that generated said stack trace; and
wherein said displayed annotated version of said source code version that generated said stack trace indicates changes in line numbering of one or more lines of code that match said source code version being utilized in said user's computing system.

2. The method as recited in claim 1 further comprising:
displaying one or more lines of code in said source code version being utilized in said user's computing along with matching one or more lines of code of said source code version that generated said stack trace that are associated with said cause of said error in response to said one or more lines of code that are associated with said cause of said error being the same between said source code version that generated said stack trace and said source code version being utilized in said user's computing system.

3. The method as recited in claim 1, wherein said source code version that generated said stack trace is stored in a repository.

4. The method as recited in claim 1, wherein said displayed annotated version of said source code version that generated said stack trace indicates one or more lines of code that do not match said source code version being utilized in said user's computing system via strikethroughs.

5. The method as recited in claim 1, wherein said version of said source code that generated said stack trace is identified in said stack trace.

6. A computer program product for identifying lines of code that caused an error as identified in a stack trace in a source code version that generated the stack trace, the computer program product comprising a computer readable storage medium having program code embodied therewith, the program code comprising the programming instructions for:
receiving a stack trace performed to detect a cause of an error;
identifying a version of a source code that generated said stack trace;
identifying one or more lines of code in said source code version that generated said stack trace that are identified in said stack trace as being associated with said cause of said error;
comparing said source code version that generated said stack trace with a version of said source code currently being utilized in a user's computing system; and
displaying one or more lines of code in said source code version being utilized in said user's computing system that correspond to said one or more lines of code of said source code version that generated said stack trace that caused said error as well as displaying an annotated version of said source code version that generated said stack trace of said one or more lines of code that caused said error with highlighted differences with respect to said source code version being utilized in said user's computing system in response to differences in said one or more lines of code that are associated with said cause of said error between said source code version that generated said stack trace and said source code version being utilized in said user's computing system;
wherein said comparison comprises finding and matching lines of code between said source code version being utilized in said user's computing system and said source code version that generated said stack trace; and
wherein said displayed annotated version of said source code version that generated said stack trace indicates changes in line numbering of one or more lines of code that match said source code version being utilized in said user's computing system.

7. The computer program product as recited in claim 6, wherein the program code further comprises the programming instructions for:
  displaying one or more lines of code in said source code version being utilized in said user's computing along with matching one or more lines of code of said source code version that generated said stack trace that are associated with said cause of said error in response to said one or more lines of code that are associated with said cause of said error being the same between said source code version that generated said stack trace and said source code version being utilized in said user's computing system.

8. The computer program product as recited in claim 6, wherein said source code version that generated said stack trace is stored in a repository.

9. The computer program product as recited in claim 6, wherein said displayed annotated version of said source code version that generated said stack trace indicates one or more lines of code that do not match said source code version being utilized in said user's computing system via strikethroughs.

10. The computer program product as recited in claim 6, wherein said version of said source code that generated said stack trace is identified in said stack trace.

11. A system, comprising:
  a memory unit for storing a computer program for identifying lines of code that caused an error as identified in a stack trace in a source code version that generated the stack trace; and
  a processor coupled to the memory unit, wherein the processor is configured to execute the program instructions of the computer program comprising:
    receiving a stack trace performed to detect a cause of an error;
    identifying a version of a source code that generated said stack trace;
    identifying one or more lines of code in said source code version that generated said stack trace that are identified in said stack trace as being associated with said cause of said error;
    comparing said source code version that generated said stack trace with a version of said source code currently being utilized in a user's computing system; and
    displaying one or more lines of code in said source code version being utilized in said user's computing system that correspond to said one or more lines of code of said source code version that generated said stack trace that caused said error as well as displaying an annotated version of said source code version that generated said stack trace of said one or more lines of code that caused said error with highlighted differences with respect to said source code version being utilized in said user's computing system in response to differences in said one or more lines of code that are associated with said cause of said error between said source code version that generated said stack trace and said source code version being utilized in said user's computing system;
  wherein said comparison comprises finding and matching lines of code between said source code version being utilized in said user's computing system and said source code version that generated said stack trace; and
  wherein said displayed annotated version of said source code version that generated said stack trace indicates changes in line numbering of one or more lines of code that match said source code version being utilized in said user's computing system.

12. The system as recited in claim 11, wherein the program instructions of the computer program further comprises:
  displaying one or more lines of code in said source code version being utilized in said user's computing along with matching one or more lines of code of said source code version that generated said stack trace that are associated with said cause of said error in response to said one or more lines of code that are associated with said cause of said error being the same between said source code version that generated said stack trace and said source code version being utilized in said user's computing system.

13. The system as recited in claim 11, wherein said source code version that generated said stack trace is stored in a repository.

14. The system as recited in claim 11, wherein said displayed annotated version of said source code version that generated said stack trace indicates one or more lines of code that do not match said source code version being utilized in said user's computing system via strikethroughs.

* * * * *